Sept. 29, 1925.

J. J. LAWLER 1,555,592

AUTOMATIC HEAT CONTROLLING REGULATOR

Filed Nov. 1, 1924   3 Sheets-Sheet 1

Inventor
J. J. Lawler
By Bryant & Lowry
Attorneys

Sept. 29, 1925. 1,555,592
J. J. LAWLER
AUTOMATIC HEAT CONTROLLING REGULATOR
Filed Nov. 1, 1924  3 Sheets-Sheet 2
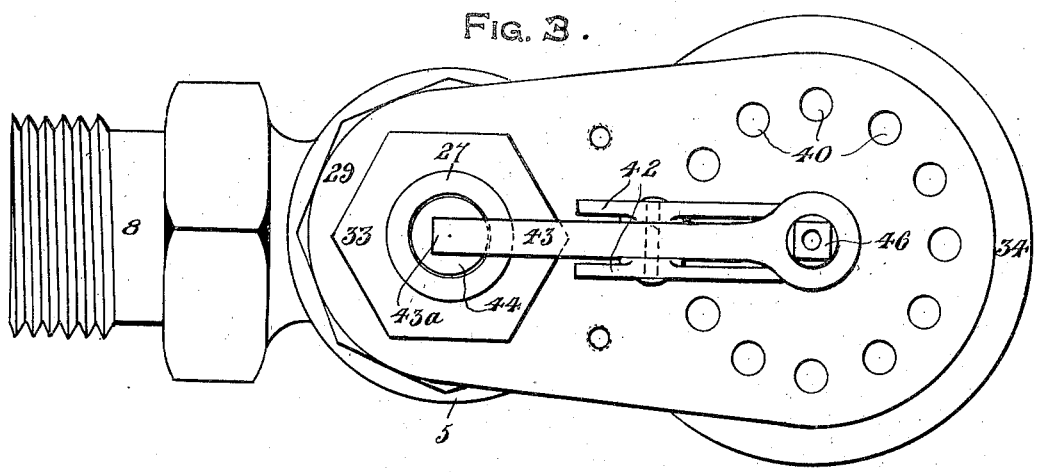
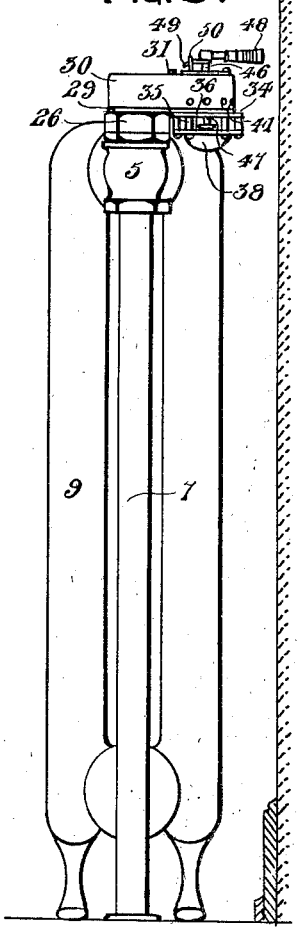
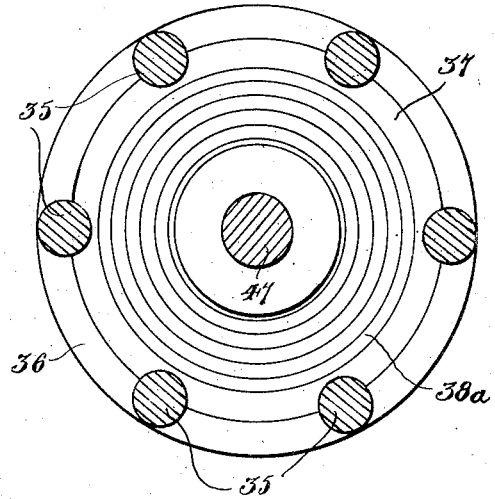
Inventor
J. J. Lawler
By Bryant & Lowry
Attorneys Sept. 29, 1925.  1,555,592
J. J. LAWLER
AUTOMATIC HEAT CONTROLLING REGULATOR
Filed Nov. 1, 1924    3 Sheets-Sheet 3

Patented Sept. 29, 1925.

1,555,592

UNITED STATES PATENT OFFICE.

JAMES J. LAWLER, OF MOUNT VERNON, NEW YORK.

AUTOMATIC HEAT-CONTROLLING REGULATOR.

Application filed November 1, 1924. Serial No. 747,264.

*To all whom it may concern:*

Be it known that I, JAMES J. LAWLER, a citizen of the United States of America, residing at Mount Vernon, in the county of Westchester and State of New York, have invented certain new and useful Improvements in Automatic Heat-Controlling Regulators, of which the following is a specification.

This invention relates to new and useful improvements in automatic heat controlling regulators.

The primary object of this invention is to provide an automatic control for shifting members, such as valves, operable by variations in the temperature of the atmosphere surrounding and entering the device.

A further object of the invention is to provide thermostatic controlling means for valves, such as those employed for controlling the flow of heating medium in radiators, whereby the temperature in an enclosure may be maintained uniformly at a predetermined degree.

A still further object of the invention is to provide a thermostatic regulator for controlling heat, rendering the heating problem of buildings or other enclosures more economical as well as sanitary by insuring uniform temperature of a predetermined degree.

Another object of the invention is the provision of an automatic regulator for controlling the flow of heating medium in radiators which may be adjusted bodily in respect to a radiator for adapting the same to different surroundings.

And still another object of the invention is to provide a device of the above mentioned type which is of exceedingly simple construction and which eliminates the use of electricity, hydraulic power, or thermometers as well as any special pipe lines, the invention being readily installed upon any heat radiator for permanent use in connection therewith.

Other objects and advantages of the invention will be apparent during the course of the following description.

Figure 1:
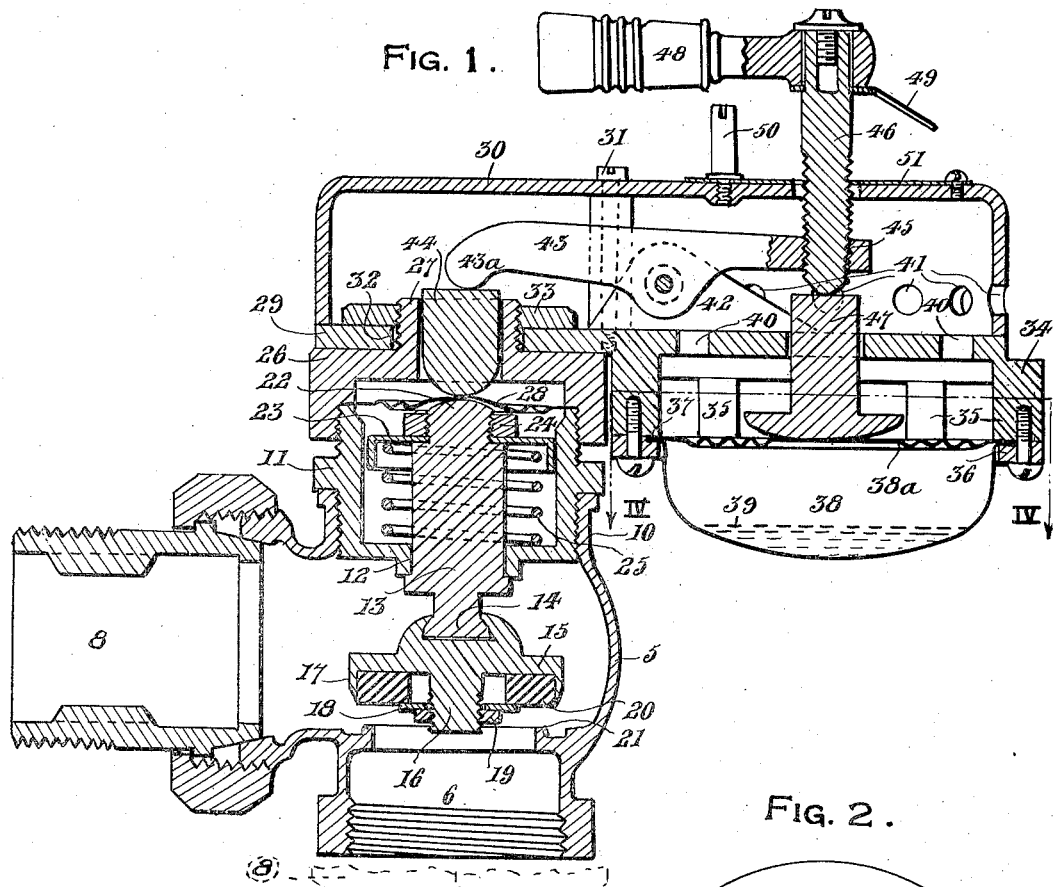
Figure 2:
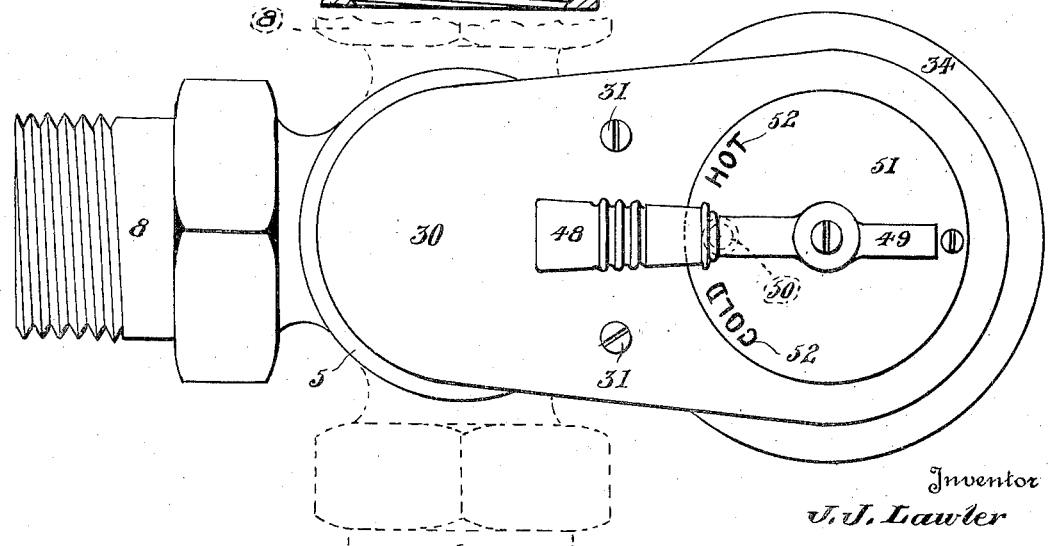

In the accompanying drawings forming a part of this specification and in which like numerals are employed to designate like parts throughout the same, Figure 1 is a central vertical sectional view of the regulator embodying this invention, Figure 2 is a top plan view of the regulator shown in Fig. 1 and illustrates in dotted lines the possibility of adjusting the thermostatic valve regulator unit in respect to the valve casing supporting the same, Figure 3 is a top plan view of the valve casing and regulator unit with the cover of the unit removed.

Figure 6:
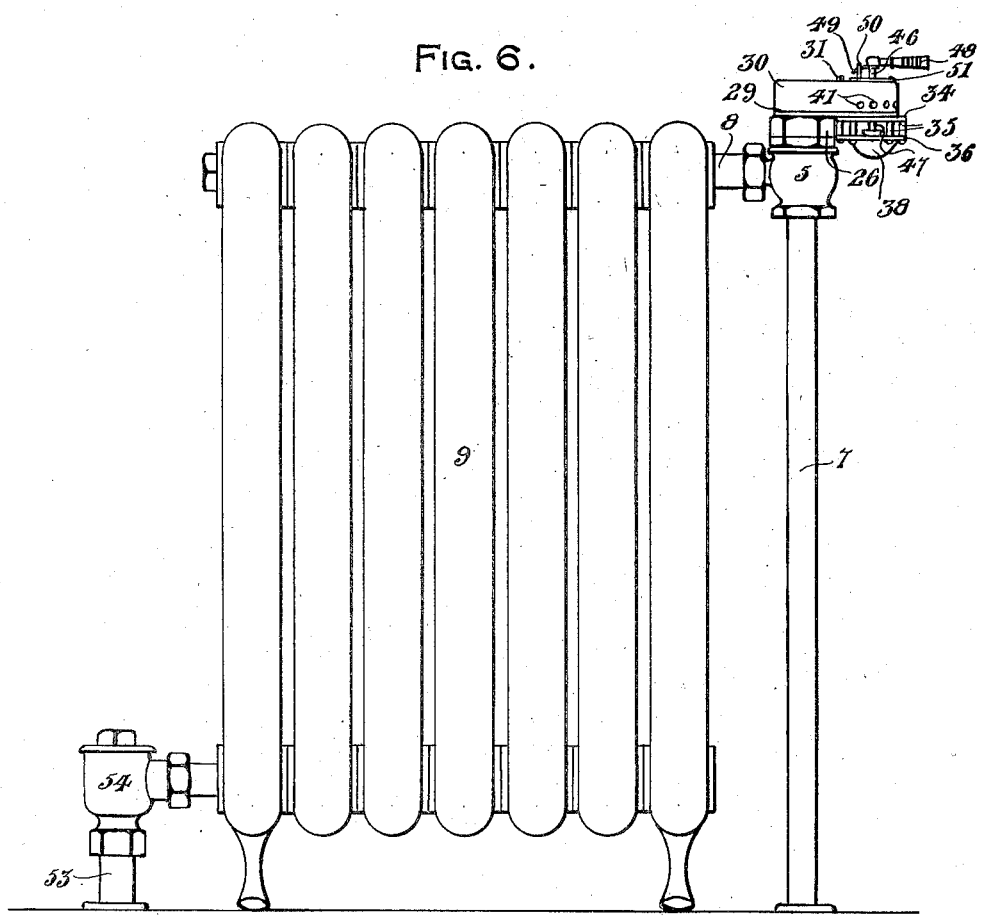

Figure 4 is a horizontal sectional view taken upon line IV—IV of Fig. 1,

Figure 5 is an end elevational view of a radiator with the valve casing interposed between the inlet service pipe and the radiator and with the thermostatic valve regulating unit mounted thereon and extending laterally rearwardly of the central vertical plane of the radiator to illustrate the possibility of locating the regulator in an out-of-the-way position, and Figure 6 is a side elevational view of a radiator with the thermostatic regulator extending at a different angle to that illustrated in Fig. 5.

In the drawings, wherein for the purpose of illustration is shown a preferred embodiment of this invention, the numeral 5 designates a valve casing having an inlet opening 6 adapted to be connected to the service pipe 7, see Fig. 5, and an outlet union 8 adapted to be connected to a radiator 9, see Fig. 5. The upper open end 10 of the casing 5 is internally screw threaded for receiving the substantially cylindrical cage 11 having the flanged opening 12 in its bottom wall within which is slidably received the valve stem 13. This valve stem carries at its lower reduced end 14 the reciprocating valve 15 having a depending threaded stem 16 and a depending peripheral flange 17. Positioned within this depending flange 17 and held against the body portion of the valve 15 by the washer 18 and nut 19, threaded upon the stem 16, is a valve packing ring 20 which is adapted to engage the valve seat 21 for shutting off the flow of heating medium thru the valve casing 5.

The upper reduced end 22 of the valve stem 13 has mounted thereon a spring retainer 23 which is removably held in place by the nut 24. Encircling the valve stem 13 and bearing at its opposite ends against the lower wall of the cage 11 and the spring retainer 23 is the spiral spring 25.

Threaded on the upper open end of the cage 11 is a cap 26 which is centrally apertured and formed with an upstanding tubular stem 27 that is externally screw threaded.

This cap 26 clamps to the upper edge of the cage 11 a corrugated diaphragm 28 which prevents leakage of heating medium from the valve casing 5.

The thermostatic valve regulator unit includes a housing comprising an elongated bottom plate 29 and a cover 30 removably secured thereto by the screws 31. The bottom plate 29 is formed with an opening 32 adjacent one end thereof which is adapted for receiving the tubular stem 27 of the cap 26. The lock nut 33 is mounted upon this stem 27 and is employed for rigidly securing the thermostatic valve regulator unit in any desired angular relation to the longitudinal axis of the valve casing 5 and outlet union 8, as best illustrated in Fig. 2.

The bottom plate 29 is further provided with an integrally formed annular plate 34 having depending therefrom the suitably spaced solid bosses 35 to the lower ends of which is secured the ring 36 which clamps the flanged edge 37 of a sealed expansion chamber 38 to the said bosses. This expansion chamber includes the corrugated diaphragm top wall 38ª and the volatile liquid content 39.

The bottom plate 29 is further provided with a circular series of apertures 40 which cooperate with the open spaces between the bosses 35 and the series of apertures 41 formed in the cover 30, for permitting a circulation of air thru the apparatus.

Projecting perpendicularly from the top surface of the bottom plate 29 are the pair of ears 42 which pivotally support the centrally fulcruming lever 43. The downwardly curved end 43ª of this lever engages an actuator 44 which is loosely mounted in the bore of the tubular stem 27 and rests upon the central portion of the diaphragm 28 in axial alinement with the valve stem 13. The remaining end of this lever 43 is apertured and internally screw-threaded, as at 45, for the reception of a threaded stem 46 which projects upwardly thru the top wall of the cover 30, as best illustrated in Figs. 1 and 2. The lower end of this threaded stem 46 is intended to be maintained in contact with the mushroom plug 47 which bears against the central portion of the corrugated diaphragm top 38ª of the expansion chamber 38.

The upper end of the threaded stem 46 has removably secured thereto an operating handle 48 by means of which the stem 46 may be moved relative to the lever 43 for varying the length of the downwardly projecting portion of the stem below the said lever. A pointer 49 is splined to the stem 46 and engages a post 50 carried by the top wall of the cover 30 for limiting the rotary movement of the stem 46 in both directions. A suitable metallic plate 51 may be mounted upon the cover 30 and may carry indicia 52 for indicating the proper direction to turn the handle 48 for varying the predetermined temperature desired.

In Figs. 5 and 6 the inlet service pipe 7 is illustrated as extending perpendicularly to a point in proximity to the upper ends of the radiator sections whereby the feeding of heating medium to the radiator 9 occurs at the upper end thereof. In Fig. 6, the opposite end of this radiator 9 is illustrated as having an outlet pipe 53 which carries a radiator steam trap 54 that is connected to the lower end of the radiator. Figs. 5 and 6 clearly illustrate the possibility of adjusting the thermostatic regulator unit in respect to the radiator so that the said unit may extend laterally therefrom either to the side, the rear, or the front whereby the regular unit may be connected to a radiator located in the corner of a room or extending along one side wall thereof. Fig. 5 clearly shows the regulator unit positioned entirely rearwardly of the front plane of the radiator 9 so that the same will not constitute an obstruction.

The operation of this automatic heat controlling regulator may be described as follows:—

The reciprocating valve carried by the casing 5 is movable in respect to the valve seat 21 for controlling the amount of heating medium passing thru the said casing. This valve 15 is shown in Fig. 1 in its fully opened position, the spring 25 normally tending to maintain the said valve in this position. By rotating the stem 46 so that its lower end will project a greater distance below the lever 43, the valve 15 may be manually moved toward the seat 21 or entirely moved into engagement therewith. Such adjustment of the stem 46 will vary the degree to which the valve may be opened or will entirely seat or close the same. It will be seen, that this adjusting of the stem 46 in respect to the lever 43 varies the length of the mechanical train which extends from the valve 15 to the lower end of the mushroom plug 47.

The sealed expansion chamber 38 is provided with a suitable quantity of volatile liquid 39 which is so prepared or compiled that it will boil at about 130°. The boiling of this liquid 39, of course, will expand the chamber 38 so that the corrugated diaphragm 38ª will bulge upwardly for moving the mushroom plug 47 vertically whereby the lever 43 will be rocked to move the actuator 44 downwardly against the valve stem 13, thereby partially or completely closing the valve 15. By operating the stem 46, by means of the handle 48, the regulator may be adjusted to maintain the temperature of a room or other enclosure at any predetermined heat and will constantly maintain such heat uniform. It will be seen, of course, that the stem 46 may be operated independently of the expansion chamber 38 for entirely closing the valve.

It has been stated above that the volatile liquid 39 within the chamber 38 has been prepared to boil at a temperature of about 130°. It has been determined that when a room, equipped with this regulator and a radiator, arrives at a temperature of 70°, the heated air from the radiator and normally circulating within the room will influence the liquid 39 and the radiation of heat thru the valve casing and the regulator housing will also influence the volatile liquid and expansion chamber so that the temperature of the latter will be at about 135° or 65° hotter than the atmosphere in the room or enclosure.

It is to be understood that I do not desire to limit myself to the positioning of the automatic heat-regulator embodying this invention at the upper end of a radiator, as illustrated in Figs. 5 and 6 for the device, without any changes, may be as successfully used in combination with a radiator receiving its supply of heating medium at the lower end thereof.

It is now believed that the method of constructing and the manner of operating this regulator device will be completely understood by those skilled in the art.

It is to be understood that the form of this invention herewith shown and described, is to be taken as the preferred example of the same, and that various changes in the shape, size, and arrangement of parts, may be resorted to, without departing from the spirit of the invention or the scope of the subjoined claims.

Having thus described the invention, I claim:—

1. In a device of the type described, a valve casing, a cage mounted in said casing, a reciprocating valve carried by the cage, a spring in the cage for opening the valve, a cap mounted on the cage, a tubular stem carried by the cap in axial alinement with the valve, an actuator freely mounted in the bore of said stem, a laterally projecting housing connected to said stem for angular adjustment in respect to the casing, an expansion chamber depending from the housing, a centrally pivoted lever mounted in the housing and engaging the actuator at one end, and adjustable means connecting the expansion chamber and the remaining end of the lever for varying the distance said valve may open and for causing expansion of the chamber to operate said lever for closing said valve.

2. In a device of the type described, a valve casing, a cage mounted in said casing, a reciprocating valve carried by the cage, a spring in the cage for opening the valve, a cap mounted on the cage, a tubular stem carried by the cap in axial alinement with the valve, an actuator freely mounted in the bore of said stem, a laterally projecting thermostatic valve regulator unit pivotally mounted on said cap and stem and operatively engaging said acuator, and means for locking said unit in any desired pivotally adjusted position.

3. In a device of the type described, a valve casing, a cage mounted in said casing, a reciprocating valve carried by the cage, a spring in the cage for opening the valve, a cap mounted on the cage, a tubular stem carried by the cap in axial alinement with the valve, an actuator freely mounted in the bore of said stem, a laterally projecting housing connected to said stem for angular adjustment in respect to the casing, an expansion chamber depending from the housing, a centrally pivoted lever mounted in the housing and engaging the actuator at one end, a manually actuated stem adjustably connected to the remaining end of the lever and capable of being arranged to depend different distances from the lever to vary the distance said valve may open, and a plug resting upon the expansion chamber and engaged by the lower end of the stem for causing expansion of the chamber to operate said lever for closing said valve.

In testimony whereof I affix my signature.

JAMES J. LAWLER.